(12) United States Patent
Zalman et al.

(10) Patent No.: US 8,621,273 B2
(45) Date of Patent: Dec. 31, 2013

(54) ENHANCED SCALABLE CPU FOR CODED EXECUTION OF SW IN HIGH-DEPENDABLE SAFETY RELEVANT APPLICATIONS

(75) Inventors: Rafael Zalman, Markt Schwaben (DE); Antonio Vilela, Mering (DE); Alexander Griessing, Brunnthal (DE); Wilhard Wendorff, Munich (DE)

(73) Assignee: Infineon Technologies AG, Neubiberg (DE)

( * ) Notice: Subject to any disclaimer, the term of this patent is extended or adjusted under 35 U.S.C. 154(b) by 303 days.

(21) Appl. No.: 12/954,977

(22) Filed: Nov. 29, 2010

(65) Prior Publication Data
US 2012/0137171 A1 May 31, 2012

(51) Int. Cl.
*G06F 11/00* (2006.01)
(52) U.S. Cl.
USPC .......................................................... 714/10
(58) Field of Classification Search
USPC .......................................................... 714/10
See application file for complete search history.

(56) References Cited

U.S. PATENT DOCUMENTS

| | | | | |
|---|---|---|---|---|
| 5,416,783 A | * | 5/1995 | Broseghini et al. ............ | 714/728 |
| 2004/0157650 A1 | * | 8/2004 | Wissinger et al. ......... | 455/569.2 |
| 2005/0188182 A1 | * | 8/2005 | Hoyle et al. .................... | 712/224 |
| 2008/0256419 A1 | * | 10/2008 | Wojewoda et al. ............ | 714/766 |
| 2009/0259612 A1 | * | 10/2009 | Hanson ............................ | 706/47 |

OTHER PUBLICATIONS

IEG 61508, Functional Safety of Electrical/Electronicl Programmable Electronic Safety-Related Systems, Parts 2, 6, 7, Edition 2 COV, 2008, IEC. Sections 2, 6, and 7. 256 Pages.
Vital software: Formal method and coded processor, Daniel Dolle Siemens Transportation System, ERTS 2006 Toulouse. 8 pages.
Vital Coded Microprocessor Principles and Application for Various Transit Systems, P. Forin, IFAC Control, Computers, Communications in Transportation, France, 1989. 8 Pages.
The coded microprocessor certification, Ozella Patrick, INERT5-CRESTA. 6 Pages.
Software Protection Mechanisms for Dependable Systems, Ute Wappler, Technische Universtat Dresden, Martin MOiler, Siemens AG, CT SE 2. 6 Pages.
E4DI: Error Detection by Diverse Data and Duplicated Instruction, Namshuk Oh, Subhasish Mitra, Edward J. McCluskey, IEEE 2002. 20 Pages.
A Hybrid Self-Testing Methodology of Processor Cores, Tai-Hua Lu, Chung-Ho Chen and Kuen-Jong Lee, Dept. of Electrical Engineering and Institute of Computer and Communication Engineering, national Cheng Kung University Tainan, Taiwan, 2008. 4 Pages.

(Continued)

*Primary Examiner* — Yair Leibovich
(74) *Attorney, Agent, or Firm* — Eschweller & Associates, LLC

(57) ABSTRACT

Some embodiments of the invention relate to a single processor configured to comprise configurable hardware extensions, disposed within a data path configured to selectively provide either encoded data or original data, that allow for two modes of operation. In a high performance mode, the hardware extensions allow for increased processing bandwidth by using the hardware extensions for processing extended data (i.e., additional original data). In a safety integrity mode the hardware extensions allow for parallel processing of encoded data concurrent with the processor executing a SBST by processing a self-test program and self-test data. Therefore, the single channel processor provides a single core system that can selectively achieve either high safety integrity levels (e.g., SIL3) for safety relevant applications or high performance for non-safety relevant applications.

16 Claims, 6 Drawing Sheets

(56) References Cited

OTHER PUBLICATIONS

Effective Software-Based Self-Test Strategies for On-Line Periodic Testing of Embedded Processors, Antonis Paschalis, Dimitris Gizopoulos, IEEE, 2005. 12 Pages.

Low-Cost Software-Based Self-Testing of RISC Processor Cores, N. Kranitis, G. Xenoulis, D. Gizopoulos, A. Paschalis, Y. Zorian, Univ. of Athen Greece and Virage logic Freemont USA, Date 2003. 6 Pages.

Application and Analysis of RT-Level Software-Based Self-Testing for Embedded Processor Cores, N. Kranitis, G. Xenoulis, D. Gizopoulos, A. Paschalis, Y. Zorian, Univ. of Athen Greece and Virage Logic Freemont USA, ITC 2003. 10 Pages.

Frits—A Mircoprocessor Functional BIST Method, Praveen Parvathala, Kailas Maneparambil, William Lindsay, Intel © Corporation, IEEE 2002. 9 Pages.

Embedded Processor-Based Self-Test. Gizopoulos, Dimitris, et al. Kluwer Academic Publishers. 6 Pages.

Baleani, M. et, al. "Fault-Tolerant Platforms for Automotive Safety-Critical Applications." IN: Proceedings of the 2003 International Conference on Compilers, Architecture and Synthesis for Embedded Systems. 2003, S. 170-177, ISBN: 1-58113-676-5. 8 Pages.

* cited by examiner

ENHANCED SCALABLE CPU FOR CODED EXECUTION OF SW IN HIGH-DEPENDABLE SAFETY RELEVANT APPLICATIONS

BACKGROUND

Computer systems are increasingly being used in applications where they are entrusted with functions upon which human life can depend. Such safety relevant computer systems may be implemented into medical devices, anti-lock braking systems in automobiles, shut-down systems at nuclear power plants, etc. Safety relevant computer systems may be coupled with sensors configured to sense operations of the systems, and to react to possible dangerous situations with a speed and dependability that is unmatched by human capabilities. Accordingly, in safety relevant computer systems, hardware based failure is unacceptable and the timely detection of any such failure is important.

The International Electrotechnical Commission (IEC) regulates the integrity of safety relevant computer systems. The integrity of a computer system processor may be measured according to safety integrity levels (SIL). In general, there are four different safety integrity levels as defined by IEC 61508. The safety integrity levels range from a minimum of SIL1 to a maximum of SIL4. Devices having various safety importances are required to meet the standards set forth in a corresponding SIL. For example, airplanes, nuclear reactors, and the like have a high safety importance and therefore are required to use computer systems meeting the most stringent safety standard, SIL4.

To achieve a given SIL a device must meet targets for the maximum probability of dangerous failure and a minimum safe failure fraction. For example, a SIL3 device (e.g., used for automobiles) has probability of dangerous failure per hour of 1e-7 to 1e-8 and must detect more than 99% of all possible dangerous failures.

DRAWINGS

DETAILED DESCRIPTION

Figure 1:
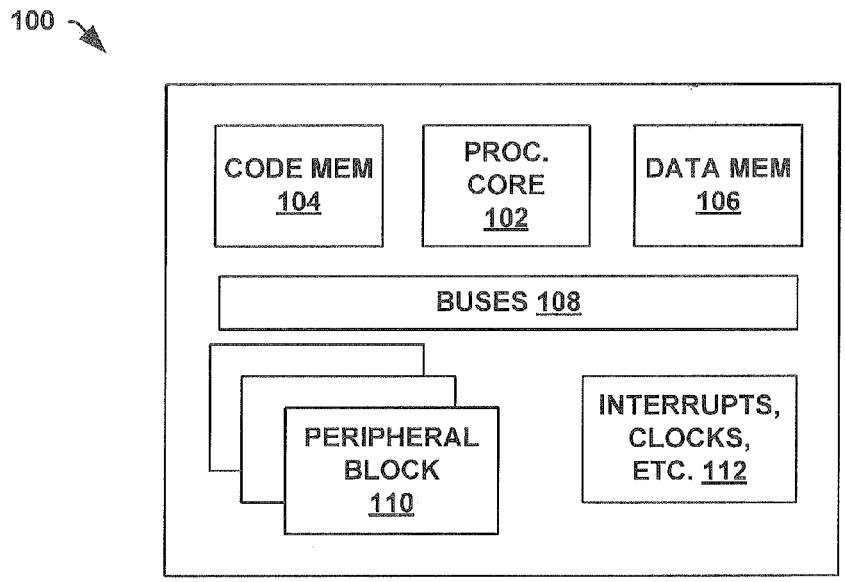
FIG. 1 illustrates a block diagram of an embedded system configurable for high performance or safety relevant applications.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

As provided herein, the following terms are intended to have specific meaning as set forth below. The term data refers to data. The term code refers to program code comprising a collection of instructions. The term instruction refers to a single instruction (i.e., an atomic instance of program code). The term encoded data refers to the union of M+N bits of original data and redundant data. The terms original data or information bits refers to M bits of actual un-encoded data.

The detection of processor faults is important in safety relevant applications to ensure a computer system's functions are performed consistently. Processor fault detection can be performed by various techniques (e.g., hardware based techniques, software based self-test, etc.). For example, hardware based techniques such as spatial redundancy may employ multiple redundant processing cores (e.g., lock step CPUs) to execute multiple instances of the same software program code synchronously in parallel on the multiple cores. The results of the redundant processing cores are compared and divergence between the results indicates an error in the processor.

Such diagnostic coverage techniques available for processor fault detection are able to guarantee a certain processor integrity, however often to reach a high integrity level significant resources are used (e.g., chip area, power consumption, development costs, etc.).

The inventors have appreciated that coded processing fault detection techniques mainly detect faults in data storage, processing, and addressing, while software based self-test (SBST) fault detection techniques are well suited to detect faults in decoding and program flow control. Therefore, the two processor fault detection techniques detect faults in complementary areas of processor operation. Based upon this appreciation, the inventors have realized that through use of both a software based self-test (SBST) and coded processing the overall fault detection of a single channel processor can be improved while scaling back the complexity and cost (e.g., implementation cost, development cost, etc.) of implementing each individual method.

Accordingly, a single channel processor having one core that is configured to achieve a high safety integrity level using configurable hardware extensions for coded processing and a software based self-test (SBST) is provided herein. The single channel processor further provides a single core system that can selectively achieve either high safety integrity levels (e.g., SIL3) for safety relevant applications or high performance for non-safety relevant applications.

In particular, the single channel processor is configured to comprise configurable hardware extensions, disposed within a data path configured to selectively provide either encoded data (e.g., comprising redundant data bits) or extended original data, which allow for two modes of operation. In a high performance mode, the hardware extensions allow for increased processing bandwidth by using the hardware extensions for processing of extended data bits (i.e., additional information bits). In a safety integrity mode the hardware extensions allow for parallel processing of both original data bits and redundant data bits (i.e., redundant data provided for integrity purposes), interleaved with the processor executing a software based self-test program (SBST). Therefore, the single channel processor allows for a multi-use processor core that can offer a high level of safety integrity or a high level of performance at a relatively low cost increase.

FIG. 1 illustrates a block diagram of an exemplary embedded system 100 configurable for high performance or safety relevant applications, as provided herein. The embedded system 100 comprises a single channel processor core 102 with hardware extensions that are configured to process code received from a program memory 104 and data received from a data memory 106 by way of one or more processor buses 108. In one embodiment, the program memory 104 is configured to store test code (that may be used to implement a software based self-test), and program code (for general processing). The embedded system 100 may also comprise other components such as peripheral blocks 110 or interrupts, clocks, etc. 112, for example.

When operating in a safety integrity operation mode, the program code is provided to the single channel processor core 102 in the normal course of processing to act upon an encoded data word. The encoded data word may comprise M+N encoded data bits (e.g., 40 bits), wherein M bits (e.g., 32 bits) comprise original data and N bits (e.g., 8 bits) comprise redundant bits. The encoded data word may be generated by an encoding formula that forms a specific predetermined relationship between the original data bits and the redundant data bits.

As the single channel processor core 102 performs a safety related function, it will execute one or more instructions from the program memory 104 associated with that function to read, process, or write encoded data in the data memory 106 to perform the function. The single channel processor core 102 processes the encoded data word using both the CPU core and hardware extensions. In one embodiment, the single channel processor core 102 may process the original data bits using the CPU core, and the redundant data bits using the hardware extensions of the CPU core. After processing, the output resulting from the processed original data bits and redundant data bits are examined to determine if processor faults are present in the single channel processor core 102. If the specific predetermined relationship between the original data bits and the redundant data bits is still present then no errors are present in the processor core 102.

Interleaved with performing the safety related function, the processor may execute a SBST program by providing a self-test program to the single channel processor core 102. The self-test program may be provided to the single channel processor core 102 at regular intervals in time, at predetermined times, or in response to an event. The processor core 102 initiates the self-test program to act upon self test data stored in the data memory 106. The self-test program runs as a background task for the single channel processor core 102, thereby operating concurrently with the normal course of processing (e.g., with processing of encoded data) to generate a self-test program response which may be used to determine if processor faults are present in the single channel processor core.

Therefore, in a safety integrity mode the single channel processor core 102 is configured to perform two complimentary processor fault detection techniques that overlap in time. The single channel processor is configured to process encoded data words (e.g., comprising original data bits and redundant data bits, with an inherent check for mismatches between the original data bits and the redundant data bits to identify faults present in the processor) during the normal course of processing and to interleave with the processing execution of a SBST program in the background of the CPU's normal processing. The combination of these two methods, respectively addressing complementary safety risks, provides a diagnostic coverage that cannot be reasonably achieved by either single method. The combination of the two methods compensates for lacks of fault robustness of each single method and therefore improves the overall safety integrity of a system (e.g., reduces the probability of dangerous failures and maximizes the safe failure fraction).

When operating in a high performance operation mode the CPU processor core's hardware extensions are accessible for processing of extended original data bits (i.e., additional information bits). Therefore, in the high performance mode a CPU processor core's ability to process information bits is increased due to the hardware extensions. For example, in one embodiment the single channel processor core 102 is configured to process a first portion of a data word (e.g., comprising original data bits) and the hardware extensions are configured to parallel process a remaining portion of the data word (e.g., comprising extended original data bits). Furthermore, in the high performance mode the SBST can be skipped (i.e., not performed) thereby reducing the computational load on the single channel processor core 102.

Figure 2:
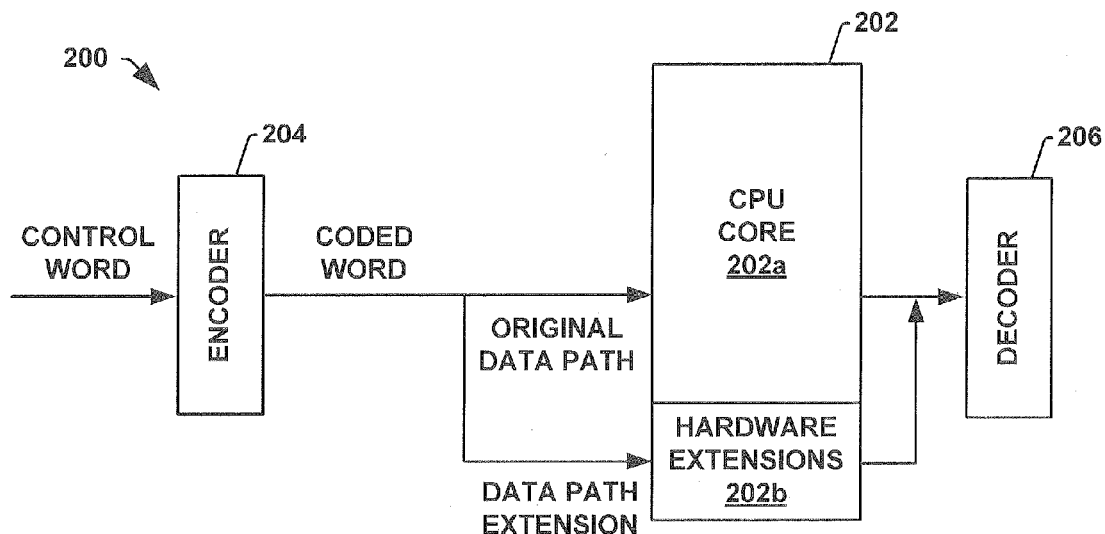
FIG. 2 illustrates a block diagram of a more detailed exemplary embodiment of a single channel processor core having hardware extension for coded processing.

FIG. 2 illustrates a block diagram of a more detailed exemplary embodiment of a data path 200 having a single channel processor core comprising hardware extension operable for coded processing.

The single channel processor core 202 comprises a CPU core 202a and hardware extensions 202b, wherein the original data path extends to the CPU core 202a and the data path extension extends to the hardware extensions 202b. The hardware extensions 202b are coupled to the CPU core 202a and are configured to comprise hardware components (e.g., transistors) that may perform both coded processing of an encoded data word natively in hardware (e.g., not in software) and processing of extended or multiple original data bits. The size of the hardware extensions 202b may vary depending on how many redundant data bits are present in the encoded data word (i.e., the safety integrity level desired). For example, for a 32-bit core processor, an encoded data word having 32-bits of original data and 8-bits of redundant data would have hardware extensions 202b that is approximately 25% of the size of the CPU core 202a. In other embodiments, larger hardware extensions (e.g., 16-bit, 32-bit) may be used to ensure greater safety integrity levels through the inclusion of more redundant bits within the encoded data word.

Although small hardware extensions (e.g., 8 bits) are generally insufficient to by themselves provide the required level of safety integrity (e.g., SIL3), the minimal hardware extensions provided herein can provide a high level of safety integrity since the scope of the coded processing of an encoded data word may be scaled down because the coded processing is performed in conjunction with a SBST. In other words, minimal hardware extension may be used since the coded processing does not have to achieve of the full diagnostic fault detection coverage (e.g., SIL3) by itself. Therefore, the hardware extensions 202b may provide for the processing of encoded data with minimal hardware extensions (e.g., 25% the size of the CPU core 202a). This is also in contrast to multi-core processing techniques having architectures that do not have data paths configured to handle the format of the encoded data and/or do not provide the native hardware operations to process the encoded data.

Referring again to FIG. 2, during operation, a data word comprising original data bits (e.g., a 32-bit data word) may be provided to an encoding block 204. The encoding block 204 will perform an encoding operation on the data word to generate an encoded data word having original data bits and redundant data bits. In particular, the encoding operation may comprise the execution of an encoding algorithm on the original data bits (e.g., 32-bits of original data) to form redundant data bits (e.g., 8-bits of redundant data), wherein the redundant data bits are formed to have a relationship with the original data bits that is defined by the encoding algorithm. The relationship between the redundant data bits and the original data bits at the input and output of the single channel processor core 202 may be used to recognize processor faults.

A program code is provided to the single channel processor core 202 causing the CPU core 202a and hardware extensions 202b to perform processing on the encoded data word. For example, a 40-bit encoded data word having 32-bits of original data and 8-bits of redundant data, which is provided to the CPU core 202a and hardware extensions 202b, may result in an output comprising a 40-bit word having 32-bits of original data and 8-bits of redundant data.

In one embodiment, an encoded data word may comprise M-bits of original data embedded in the encoded data word without any modifications and N bits of encrypted redundant data embedded in the encoded data word. In such an embodiment, the CPU core 202a may be configured to process the M bits of original data comprised within the encoded data word and the hardware extensions 202b may be configured to process the N bits of encrypted redundant data comprised within the encoded data word natively in hardware, thereby allowing parallel processing of the original data and the redundant data. In such an embodiment, the original data undergoes a first processing (by CPU core 202a) while the redundant data concurrently undergoes a second, sometimes more complex, processing (by hardware extensions 202b) due to the encoding algorithm that generates the redundant data having a specific relationship with the original data. For example, the original data may undergo a straightforward multiplication, while the redundant data may undergo a processing operation that is not a straightforward multiplication.

In the encoded data word output from the single channel processor core 202, redundant data bits retaining the relationship with the original data bits indicate that no processor faults are present. For example, if the encoded data word output from the single channel processor core 202 has redundant data bits and original data bits having the same relationship as redundant and original data bits in the encoded data word input to the single channel processor core 202, the single channel processor core 202 does not have faults. In contrast, if the encoded data word output from the single channel processor core 202 has redundant data bits and original data bits that do not retain the same relationship as the redundant and original data bits in the input encoded data word then faults are present in the single channel processor core 202.

Therefore, as shown in FIG. 2 the single channel processor core 202 is comprised within an extended data path that allows for direct processing of an encoded data word (i.e., processing of redundant data in parallel with processing of original data). In one embodiment, the CPU core 202a and the hardware extensions 202b are differentiated from each other in that the hardware extensions 202b are within a data path that selectively provides either extended original data or redundant data of an encoded data word to the hardware extensions 202b, while the CPU core 202a is within a data path that provides original data bits or original data bits of an encoded data word.

It will be appreciated that the hardware extensions described herein may result in various data path extensions. For example, a hardware extension to a CPU core may also have associated bus extensions, memory extensions, etc. Furthermore, in various embodiments the CPU core may comprise a microprocessor core or a microcontroller core.

Figure 3:
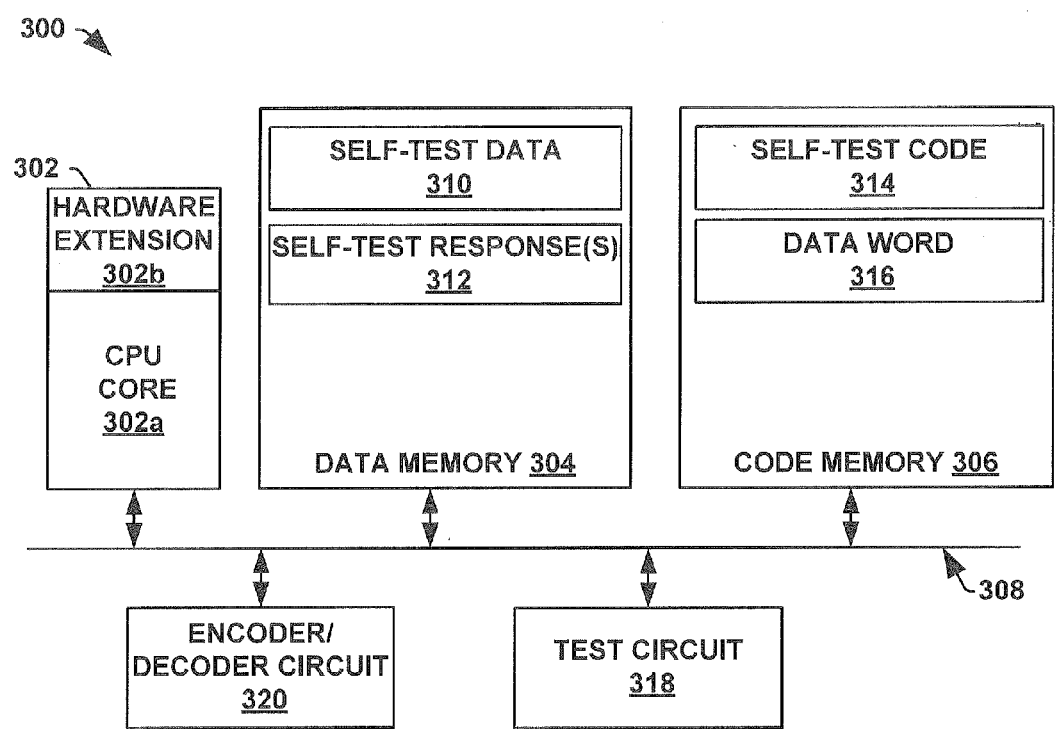
FIG. 3 illustrates a more detailed block diagram of a single channel processor configured to comprise hardware extensions for coded processing and software based self-test (SBST).

FIG. 3 illustrates a more detailed block diagram of a computer system 300 comprising hardware extensions configured to perform coded processing interleaved with the execution of a software based self-test (SBST). In software based self-testing the processor itself controls the flow of test data such that no additional circuitry is used.

As shown in FIG. 3, a program memory 306 is configured to comprise a self-test program 314 and a program code 320. When operating in a safety integrity mode the program code, encoded data words (e.g., generated from data word 316 via encoder/decoder 322), the self-test code 314, and the self-test data 310 are provided to the single channel processor 302 via processor bus 308 to run a SBST as a background task to coded processing of the encoded data words. When operating in a high performance mode the data words 316 are provided to the single channel processor 302 via bus 308 and the SBST is not performed.

More particularly, in a safety integrity mode the program code is provided to the CPU 302. The program code comprises a single set of instructions that are used to process the encoded word. Therefore, the program code comprises a single set of instructions (e.g., a single instruction) that work with a single encoded data word, containing information bits and redundant data, to perform coded processing of the encoded data word.

Interleaved with the coded processing a software based self-test (SBST) is performed. To operate a SBST a data memory 304 is configured to store self-test data 310 and program memory 306 is configured to store self-test program 314. A test circuit 320 (e.g., a CPU) is configured to access the processor bus 308 and to initiate the transfer of self-test data 310 and self-test program 314, from the data memory and program memory to a CPU processor, respectively. The self test program 314 causes the processors to operate upon the self test data 310 to perform the SBST. In various embodiments, the test circuit 320 may comprise a number of mechanisms (e.g., an external tester, a CPU, etc.) that may be used to transfer self-test program and data to a CPU processor 302 for execution.

The self-test program 314 may be developed in a test code generation step that is performed during a development stage and may comprise a sequence of binary instructions that tests a subset of the gates in the CPU (e.g., 90% of the gates). In one embodiment, the self-test program may be generated taking into account the structural architecture of the system to comprise a software program comprising a sequence of instructions that tests a subset of the gates in the CPU (e.g., 90% of the gates).

The SBST is configured to run in the background of normal computer processing. In one embodiment, the SBST may be run on a time slicing method for a couple of microseconds every few milliseconds. Upon receiving the self-test program 314 (e.g., a sequence of instructions) the single channel processor 302 executes the self-test program 314. The sequence of binary instructions comprising the self-test code 314 may be processed by logic functions implemented in the single channel processor 302 to result in a self-test response comprising a processed sequence of binary data. The processor core's responses to the executed self-test program 314 are returned to the data memory 304 through bus 308, where they are stored (self-test response(s) 312). In one embodiment, a checksum algorithm (e.g., a cyclic redundancy check (CRC)) is configured to operate on the self-test responses 312 to generate a result value from the responses. The result value is compared to a predefined value generated from the self-test data 310. Unexpected variations between the result value and the predefined values indicate that a fault is present in the single channel processor 302.

In general, the number of gates tested by a SBST is inversely proportionate to the cost (e.g., effort, time, etc.) of developing and executing the self-test program. This typically results in a high development cost for SBST code since program code attempts to test as many gates as possible. Further, CPU loading is high due to the long execution time of a SBST that is to achieve a high level of diagnostic fault detection. However, the present invention allows for a reduction in the cost of the test software program since the program does not have to be developed to address a maximum number of gates. In other words, self-test program that exercises a subset of the CPU gates may be used since coded processing is also used to achieve a high level of diagnostic fault detection (e.g., SIL3).

Figure 4A:
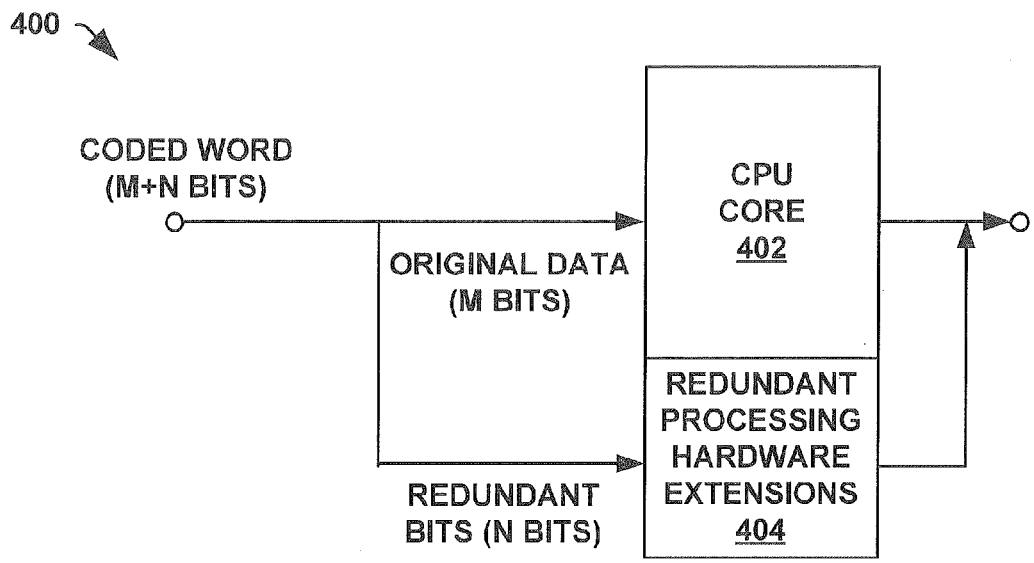
FIGS. 4A-4B illustrate data paths respectively associated with each of a safety integrity mode and a high performance mode.
Figure 4B:
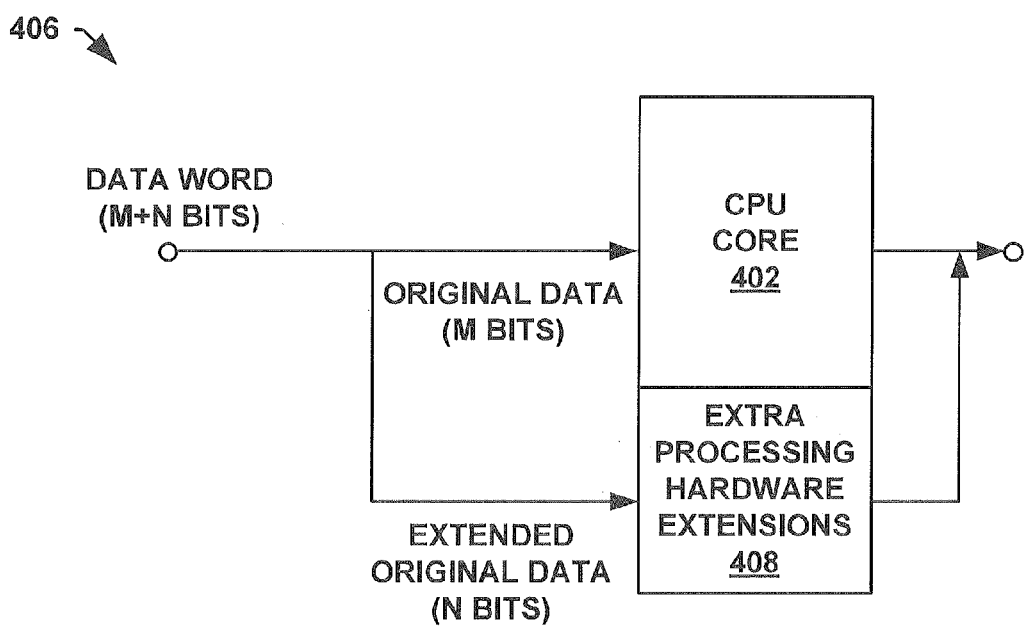

As stated above, the hardware extensions of the core processor allow for the core processor to operate in two modes of operation, a safety integrity mode and a high performance mode. FIGS. 4A and 4B illustrate data paths respectively associated with each of the safety integrity mode 400 and the high performance mode 406. The hardware extensions, provided herein, allow for an implementation of an extended data path such that in a safety integrity mode the processing of an encoded data word is accomplished, whereas in the high performance mode the processing of wider data, or single instruction, multiple data (SIMD) operations, or multiple instruction, multiple data (MIMD) operations are supported for performance improvement. It will be appreciated that although FIGS. 4A and 4B label redundant processing hardware extensions 404 and extra processing hardware extensions 408 differently, that such labels are not limiting and that the hardware extensions 404 and 408 may comprise the same hardware components, in one embodiment.

FIG. 4A illustrates a more detailed embodiment of a CPU core configured to process an encoded data word having M+N data bits, wherein M bits comprise original data embedded into the encoded data word without any modification and N bits comprise redundant data embedded into the encoded data word with encryption.

Referring to FIG. 4A, in the safety integrity mode, shown in FIG. 4A, the redundant processing hardware extensions 404 of the CPU core 402 are configured to process an encoded data word. During operation, original data bits are mapped into N redundant data bits (e.g., by an encoder circuit using modified AN or ANB codes). An encoded data word comprising an expanded data format having M normal binary data bits and N redundant data bits (i.e., data bits that are intentionally duplicated for the safety relevant purposes) with a specific predetermined relationship is formed. Therefore, the encoded data word preserves the original M data bits and an additional N redundant data bits within for fault detection purposes.

The encoded data word is provided to a core processor for processing. In one embodiment, the encoded data word is processed using an expanded data path having an extension for direct processing the redundant data bits of the encoded data word. As shown in FIG. 4A, a first part of the encoded data word having M original data bits is provided to the CPU core 402 for processing, while an extension of the data path is configured to provide the N redundant data bits to the redundant processing hardware extension 404 for coded processing that is performed natively in hardware.

For example, the single channel processor may be configured to receive a 24-bit encoded data word having a binary sequence of "0xA5A53F". The encoded data word comprises an original data part (the first 16 data bits) and a redundant data part (the last 8 data bits). The CPU core 402 may operate on the first 16 bits (0xA5A5) and the hardware extensions 404 may operate on the last 8 bits (0x3F) to provide an output encoded data word. If the output coded word contains processed original data and processed redundant data having the specific predetermined relationship therebetween no faults are present in the processor. However, if the output encoded data word contains processed original data and processed redundant data not having the specific predetermined relationship therebetween faults are present in the processor.

In a high performance mode, shown in FIG. 4B, the extra processing hardware extensions 408 are accessible for processing of extended original data bits. Therefore, in the high performance mode a single channel processor's ability to process data is increased due to the extra processing hardware extensions 408. As shown in FIG. 4B, in a high performance mode a data word having M+N bits of original binary data may be provided to the single channel processor. M bits of original data may be provided to the CPU core 402, while N bits of extended original data may be provided to the extra processing hardware extensions 408. Since the number of data bits being provided to the CPU core 402 is increased (e.g., by N additional bits in comparison to the processing load of the CPU core alone), the performance of the single channel processor is improved. Furthermore, in a high performance mode the SBST can be skipped thereby reducing the computation load on the CPU core.

For example, the CPU core 402 may be configured to receive a 24-bit data word having a binary sequence of "0x3A57F1" comprising original data bits. The CPU core 402 may operate on the first 16 original data bits and the hardware extensions may operate on the last 8 extended original data bits to provide a 24-bit output.

Switching between safety-integrity mode and high performance mode may be supported by a configurable data path design implementation. As stated above, original data undergoes a first processing while the encoded data word undergoes a different processing due to encoding that forms a specific predefined relationship between the original binary data bits and the redundant data bits. Therefore, to accommodate a data path that selectively provides either extended original data bits or encoded data to the hardware extensions, the hardware extensions are configured to perform either a simple processing similar to the CPU core or a different processing that natively performs coded processing of redundant bits.

Although FIG. 4A is described in relation to a segregated encoded word, wherein M bits of original data are not encrypted and N bits of redundant data are encrypted, it will be appreciated that the invention provided herein may also apply to encoded words wherein the M bits of original data are scrambled together with the N bits of redundant data to form a completely encrypted M+N bit wide encoded data word. In such an embodiment, software may be used in the CPU core to process encrypted data, for example.

In one embodiment the hardware extensions may comprise hardware that is operable to perform either processing of original data bits or encoded data without physical changes in the computation logic of the hardware extensions. However, the complexity of a coded processing may prevent such an embodiment from being realized and therefore in an alternative embodiment, shown in FIG. 5, the hardware extensions 508 may comprise configurable sub-units 514 and 516 which may be selectively operated based upon the data (e.g., encoded data, extended original data) which is provided to the hardware extensions 508. In other words, in a safety integrity mode, a sub-unit 514 may perform processing in the hardware extensions while in a high performance mode, a subunit 516 may perform processing in the hardware extensions.

Figure 5:
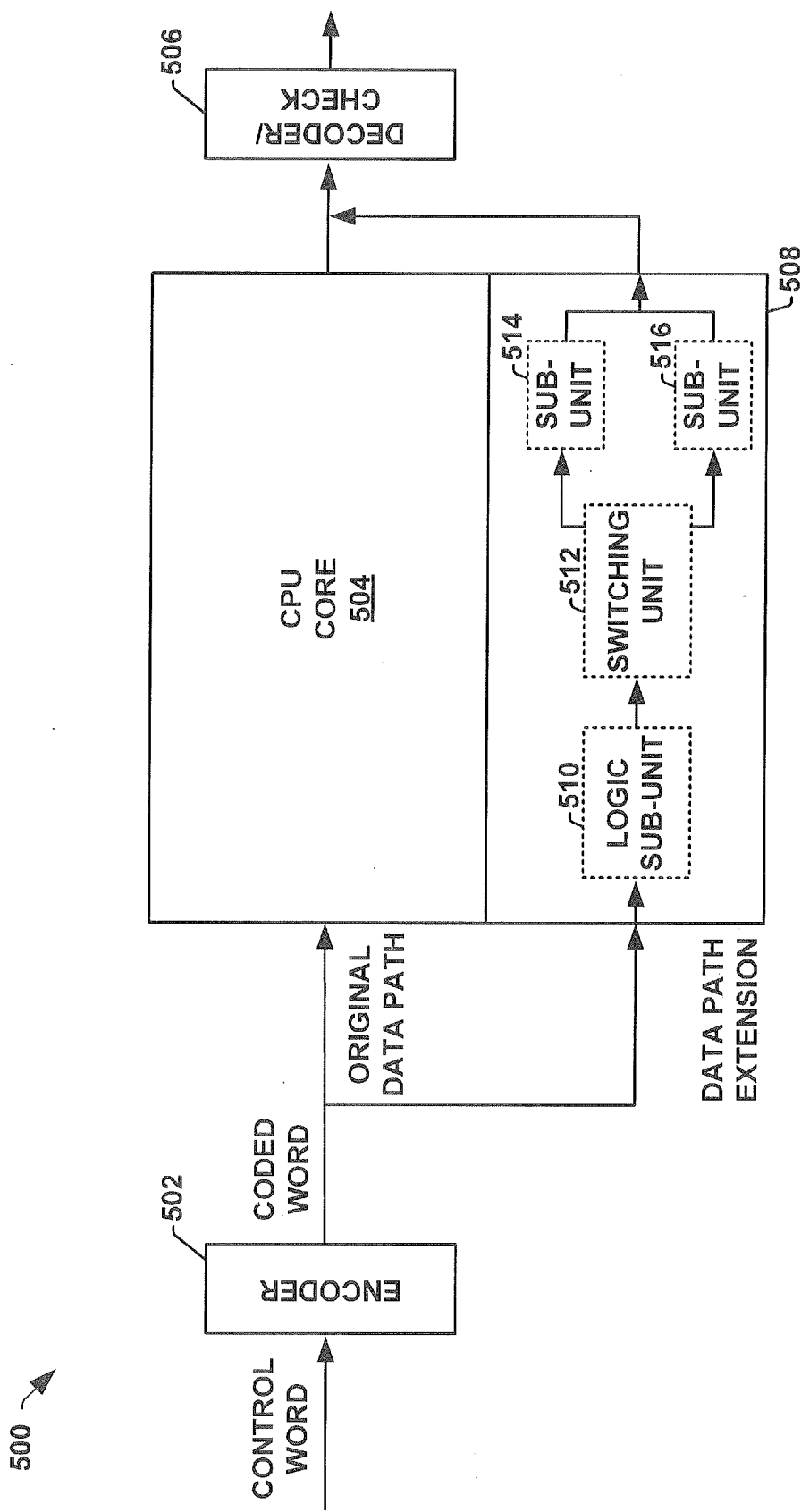
FIG. 5 illustrates block diagrams of a single channel core processor having hardware extensions comprising configurable sub-units that may be selectively operated based upon the data which is provided to the hardware extensions.

As shown in FIG. 5, an encoder 502 provides an encoded data word to hardware extensions 508 comprising one or more switching units 512 that may be configured to selectively couple logic sub-units 510 to either sub-unit 514 or sub-unit 516 to change the configuration of the hardware extensions. The switching unit 512 may comprise a logic that is configured to switch between function elements (e.g., AND gates, OR gates, etc.) based upon the functionality that is desired in the hardware extensions 508, in one embodiment.

It will be appreciated that the sub-units comprise a small portion of the hardware extensions and that the majority of the gates in the hardware extensions are used for processing of both extended original data and encoded data. Reusing the majority of the gates for processing the redundant data and the extended original data allows for a minimal increase in chip area. For example, the extended original data bits may undergo a straightforward multiplication using a multiplier, while the encoded data bits may undergo a processing operation that is similar to multiplication but not a straightforward multiplication.

Therefore, the hardware extensions provided herein are configured to natively execute coded processing (i.e., perform coded processing of coded redundant bits using hardware that is specifically configured to process the coded words).

Figure 6:
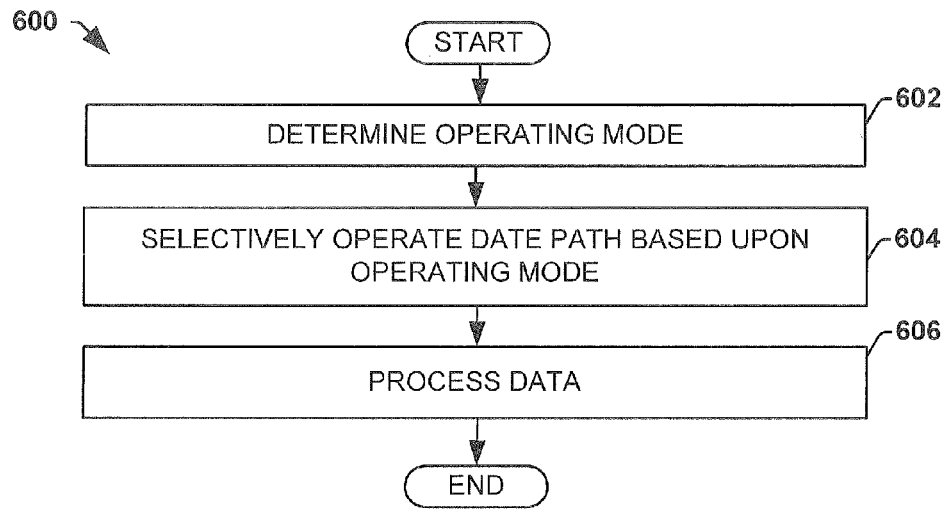
FIG. 6 illustrates a flow diagram of an exemplary method for operating an embedded system that is configurable to operate in a safety integrity mode or in a high performance mode.

FIG. 6 illustrates a flow diagram of an exemplary method 600 for operating an embedded system that is configurable to operate in a safety integrity mode or in a high performance mode.

At 602 an operating mode is determined for a processing core. The operating mode may comprise a safety relevant operating mode, wherein coded processing is performed natively in hardware extensions interleaved with the execution of a SBST, or a high performance operating mode, wherein hardware extensions are used for expanded processing of extended original data.

At 604 a data path is selectively operated based upon an operating mode. For a safety relevant operating mode encoded data is provided to hardware extensions of a single channel core processor. In a high performance operating mode extended original data is provided to hardware extensions of a single channel core processor.

At 606 data is processed. In a safety integrity mode processing of encoded data may be performed natively in hardware (e.g., redundant data bits comprised within an encoded data word may be processed in parallel with original data bits comprised within the encoded data word). In a high performance mode, processing of original data bits in the core processor may be performed in parallel with the processing of extended original data bits in hardware extensions of the core processor.

Figure 7A:
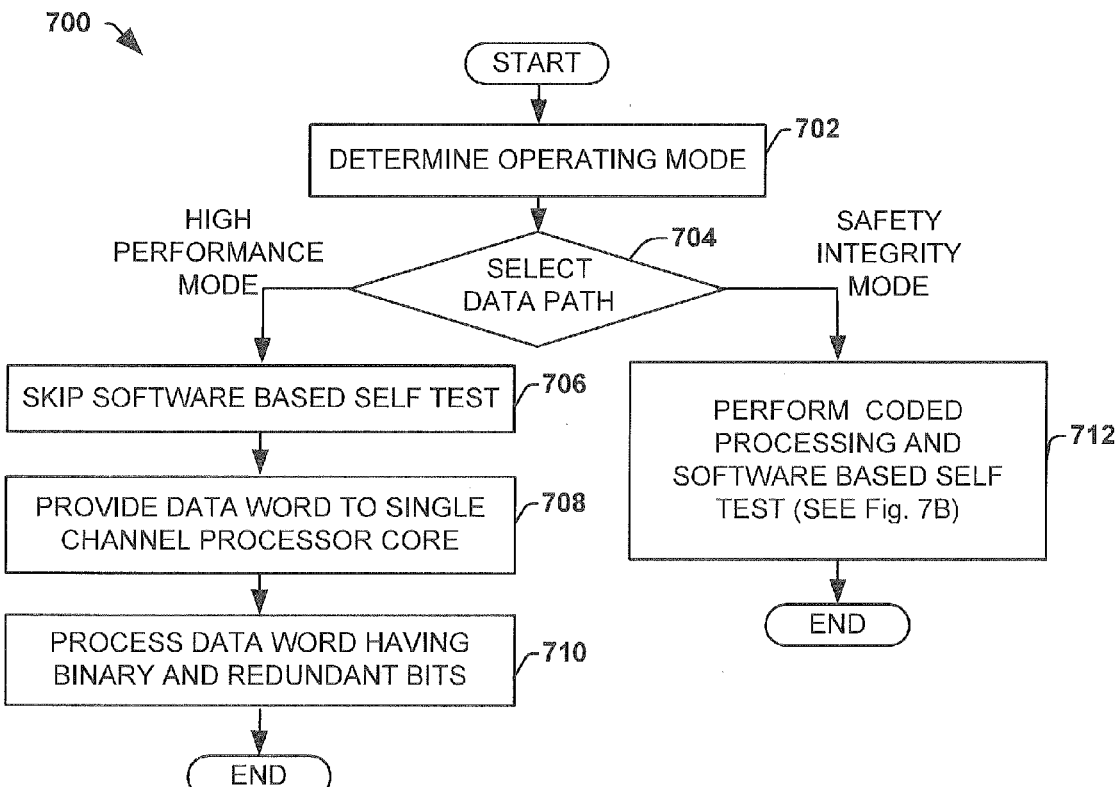
FIG. 7A illustrates a flow diagram of a more detailed method for operating an embedded system that is configurable to operate in a safety integrity mode or in a high performance mode.
Figure 7B:
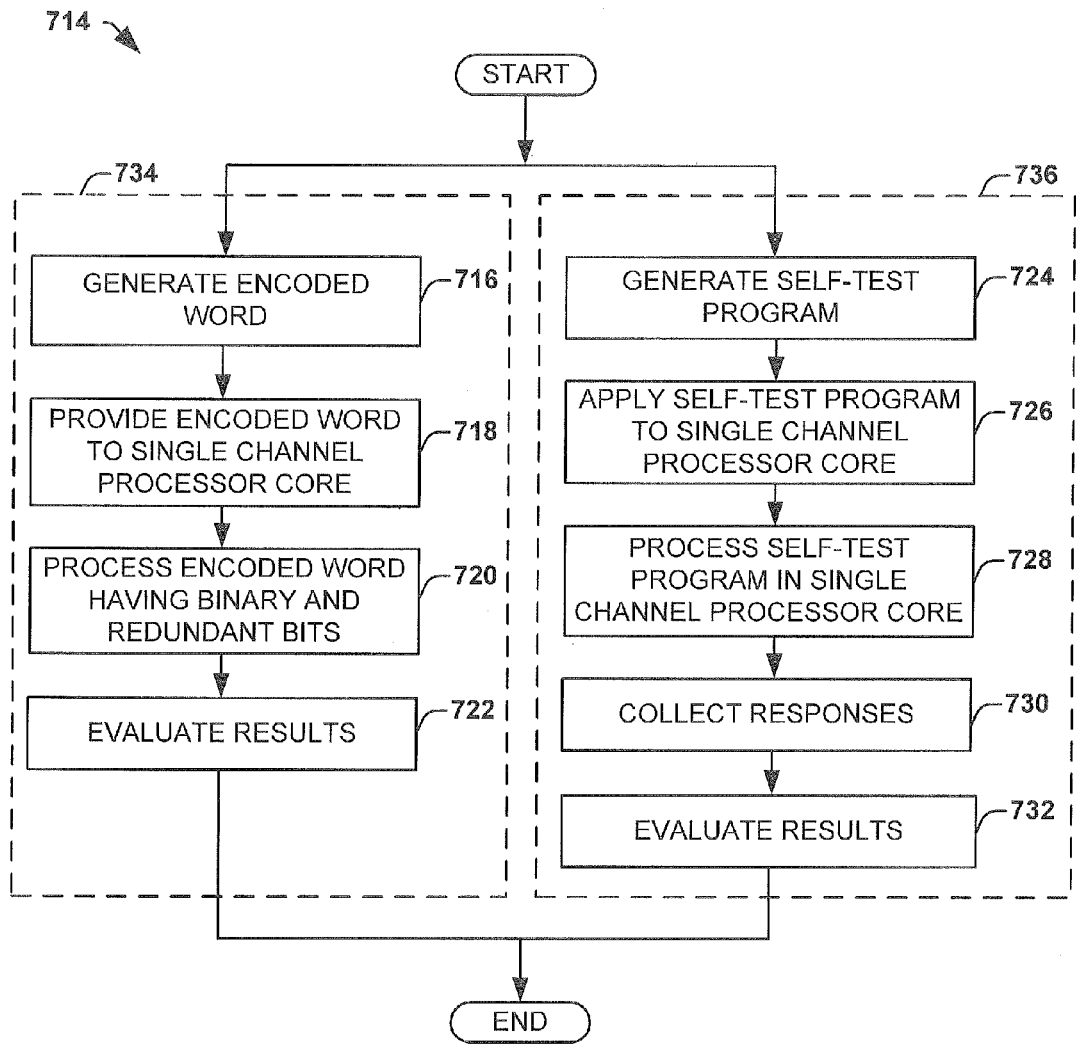
FIG. 7B illustrates a flow diagram of an exemplary method for operating in a safety integrity mode.

FIGS. 7A and 7B illustrate a flow diagram of a more detailed method 700 for operating an embedded system that is configurable to operate in a safety integrity mode or in a high performance mode.

While method 700 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

At 702 an operating mode is determined and a data path is selected based thereupon. Based upon the operating mode decision box 704 selects a data path that provides either encoded data or extended original binary data bits to hardware extensions of a core process. Cumulatively, steps 702 and 704 allow for the method to encompass two modes of operation, a safety integrity mode wherein safety integrity is the main goal of the processor and a high performance mode wherein performance is the main goal of the processor.

In one embodiment, the data path may comprise hardware extensions to a CPU core having one or more configurable sub-units, wherein the one or more sub-units may be selectively activated to enable either the safety integrity mode (e.g., perform coded processing of the encoded data) or the high performance mode (e.g., perform processing of extended or multiple original data).

If a high performance mode is chosen the method proceeds to 706 where a software based self-test is skipped.

At 708 a data word is provided to a single channel processor core. The data word may be provided to the single channel processor core via an expanded data path. The expanded data path allows for different parts of the data word to be provided to different parts of a single channel processor core (e.g., CPU core, hardware extensions) configured to process data in parallel.

The single channel processor core is configured to process the data word at 710. In one embodiment, the single channel processor core processes the different parts of the data word in parallel (e.g., original data and extended original data) for performance improvement. In alternative embodiments single instruction, multiple data (SIMD) or multiple instruction, multiple data (MIMD) operations are supported for performance improvement. Therefore, either extended or multiple original binary data may be processed in the hardware extension in parallel with processing original data bits in the CPU core in the high performance mode.

If a safety integrity mode is being implemented the method proceeds to 712, wherein encoded data words are processed with hardware extensions while a software based self-test (SBST) is executed in parallel. FIG. 7B illustrates a more detailed embodiment of a method 714 for achieving a high safety relevant integrity level using configurable hardware extensions for coded processing and a software based self-test (SBST)

Method 714 comprises two processes which may operate parallel in time. A coded processing of an encoded data word is performed in a first process 734. The coded processing comprises processing encoded data words during the normal course of processing and therefore may be performed whenever a system performs processing. A SBST program is executed in a concurrent process 736. The SBST is performed in the background and may be done periodically in time to test for faults in a processor core.

At 716 an encoded data word is generated. The encoded data word is comprised of an original data portion and a redundant data portion. The encoded data word may be generated by an encoding formula that forms a specific predetermined relationship between the original data and the redundant data.

At 718 the encoded data word is provided to a single channel processor core comprising a CPU core and hardware extensions.

The encoded data word is processed at 720. In one embodiment, the original data portion of the encoded data word is processed by CPU core while the hardware extensions process the redundant data portion of the encoded data word natively in hardware (e.g., the processing is done based upon hardware components, not relying upon software code).

At 722 the results of the processing are evaluated. The redundant and original data portions of the encoded data word output from the processor are compared to determine if processor faults are present in the CPU core. In one embodiment, if the encoded data word output from the single channel processor core has a redundant data portion and an original data portion having the same relationship as the encoded data word input into the single channel processor core, the single channel processor core does not have faults. In contrast, if the encoded data word output from the single channel processor core has a redundant data portion that does not retain the same relationship with the original data portion as the input encoded data word, then faults are present in the single channel processor core.

A self-test program is generated at 724. Development of a test program may be performed during a development stage. The self-test program may be developed to take into account the structural architecture of the system to generate a self-test program comprising a sequence of instructions that tests a subset of the gates in the single channel processing core.

The self-test program is provided to a single channel processing core at 726.

At 728 the self-test program is processed by the single channel processing core. The sequence of instructions is processed by logic functions implemented by the subset of gates to result in a self-test response comprising a processed sequence of binary data.

The responses of the self-test program are collected at 730. The CPU core's responses to the executed self-test program are returned to a data memory through bus, where they are stored.

The results of the test program responses are evaluated at 732. In one embodiment, a checksum algorithm (e.g., a cyclic redundancy check (CRC) is configured to operate on the self-test responses to generate a predefined value from the responses. The predefined value is compared to a predefined value generated from the self-test data. Unexpected variations between the two predefined values indicate that a fault is present in the processor.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more".

Furthermore, to the extent that the terms "includes", "having", "has", "with", or variants thereof are used in either the detailed description or the claims, such terms are intended to be inclusive in a manner similar to the term "comprising."

What is claimed is:

1. A computer processor having a single channel processor core, comprising:
  a CPU core configured to process original binary data bits comprised within an encoded data word;
  hardware extensions, comprising a plurality of transistors coupled to the CPU core, which are configured to selectively perform processing of original binary data bits within the encoded data word and to selectively perform coded processing of redundant data bits within the encoded data word natively in hardware;
  an original data path configured to provide one or more of the original binary data bits to the CPU core; and
  an extended data path configured to selectively provide the redundant data bits and one or more of the original binary data bits to the hardware extensions,
  wherein the single channel processor core is configured to selectively operate in one of two modes of operation:
  a safety integrity mode that provides for improved safety integrity that processes a first portion of the encoded data word comprising the original binary data bits with the CPU core, and parallel processes a remaining portion of the encoded data word comprising the redundant data bits with the hardware extensions; and
  a high performance mode that provides for improved performance that processes a first portion of the encoded data word comprising one or more original binary data bits with the CPU core, and parallel processes a remaining portion of the encoded data word comprising one or more original binary data bits with the hardware extensions.

2. The computer processor of claim 1, wherein in the high performance mode the single channel processor core is configured to support single instruction, multiple data (SIMD) operations for performance improvement.

3. The computer processor of claim 1, wherein in the high performance mode the single channel processor core is configured to support multiple instruction, multiple data (MIMD) operations for performance improvement.

4. The computer processor of claim 1, wherein the hardware extensions comprise:
  a plurality of sub-units configurable to perform coded processing of the redundant data bits within the encoded data word in the safety integrity mode and processing of original binary data bits in the high performance mode; and
  a switching mechanism configured to selectively activate one or more of the plurality of sub-units depending upon the mode of operation.

5. The computer processor of claim 1, further comprising:
  an encoding block configured to perform an encoding operation on a data word to generate the encoded data word having the original data bits and the redundant data bits, wherein the encoded data word is provided from the encoding block to the original data path and the extended data path.

6. The computer processor of claim 5, wherein the encoding operation comprises execution of an encoding algorithm on the original data bits to form redundant data bits that have a relationship with the original data bits defined by an encoding algorithm.

7. The computer processor of claim 1, wherein the CPU core is further configured to selectively perform a software based self-test (SBST) as a background task of the single channel processor core by executing a self-test program in the single channel processor core when the hardware extensions are performing processing of redundant data bits.

8. The computer processor of claim 7, wherein in the safety integrity mode the SBST is performed and wherein in the high performance mode the SBST may be skipped.

9. An electronic device, comprising:
   an encoding block configured to perform an encoding operation on a data word to generate an encoded data word having original data bits and redundant data bits;
   an original data path configured to receive one or more of the original data bits from the encoding block;
   an extended data path configured to selectively receive the redundant data bits and one or more of the original data bits from the encoding block;
   hardware extensions configured to selectively receive the redundant data bits or the original data bits from the extended data path and to selectively perform processing of extended data bits and to selectively perform coded processing of an encoded data word having redundant data bits natively in hardware; and
   a CPU core configured to receive original data bits from the original data path and to process the original data bits and to selectively perform a software based self-test (SBST) as a background task when the hardware extensions are performing processing of redundant data bits.

10. The device of claim 9, wherein the single channel processor core is configured to selectively operate in one of two modes of operation: a safety integrity mode that provides for improved safety integrity or a high performance mode that provides for improved performance.

11. The device of claim 10, wherein in the high performance mode the single channel processor core is configured to support single instruction, multiple data (SIMD) operations, or multiple instruction, multiple data (MIMD) operations are supported for performance improvement.

12. A method, comprising:
    determining an operating mode for a single channel processor core comprising hardware extensions and a CPU core;
    selectively providing redundant data bits and original data bits to the hardware extensions by way of an extended data path, based upon the operating mode;
    processing the redundant data bits natively in the hardware extensions in parallel with processing of the original data bits in the CPU core in a safety integrity operation mode; and
    processing one or more of the original data bits in the hardware extensions in parallel with processing one or more of the original data bits in the CPU core in a high performance operation mode.

13. The method of claim 12, further comprising:
    operating the single channel processor core to selectively perform a software based self-test (SBST) as a background task of the single channel processor core by executing self-test code in the single channel processor core at a periodic time interval.

14. The method of claim 12, wherein in the high performance operation mode single instruction, multiple data (SIMD) operations, or multiple instruction, multiple data (MIMD) operations are supported for performance improvement.

15. The method of claim 12, further comprising:
    selectively activating one or more configurable sub-units of the hardware extensions to perform either coded processing of the encoded data in the safety integrity operation mode or processing of original binary data in the high performance operation mode.

16. The method of claim 12, wherein in the safety integrity operation mode the SBST is performed and wherein in the high performance operation mode the SBST may be skipped.

* * * * *